United States Patent
Baudet

(10) Patent No.: US 9,915,016 B2
(45) Date of Patent: Mar. 13, 2018

(54) AUTOMOBILE CLEANABLE CARPET

(71) Applicant: FAURECIA AUTOMOTIVE INDUSTRIE, Nanterre (FR)

(72) Inventor: Daniel Baudet, Mouzon (FR)

(73) Assignee: Faurecia Automotive Industrie, Nanterre (FR)

(*) Notice: Subject to any disclaimer, the term of this patent is extended or adjusted under 35 U.S.C. 154(b) by 0 days.

(21) Appl. No.: 15/143,595

(22) Filed: May 1, 2016

(65) Prior Publication Data
US 2016/0326676 A1 Nov. 10, 2016

(30) Foreign Application Priority Data
May 4, 2015 (FR) ...................................... 15 53975

(51) Int. Cl.
*D04H 13/00* (2006.01)
*B60N 3/04* (2006.01)

(52) U.S. Cl.
CPC ........... *D04H 13/005* (2013.01); *B60N 3/048* (2013.01); *D10B 2403/0111* (2013.01); *D10B 2505/12* (2013.01)

(58) Field of Classification Search
CPC ...... B60N 3/048; D04H 13/005; D04H 13/03; D10B 2403/0111; D10B 2505/12
See application file for complete search history.

(56) References Cited

U.S. PATENT DOCUMENTS 6,548,141 B2 * 4/2003 Nagata .................. B60N 3/048
428/95
2007/0009723 A1 1/2007 Ogawa

FOREIGN PATENT DOCUMENTS

EP 0902115 A2 2/1999
GB 2297059 A 7/1996

OTHER PUBLICATIONS

French Search Report for FR 15 53975, dated Mar. 4, 2016, 2 pages.

* cited by examiner

*Primary Examiner* — Arti Singh-Pandey
(74) *Attorney, Agent, or Firm* — Reising Ethington P.C.

(57) ABSTRACT

A carpet or other interior piece for an automobile vehicle includes a non-woven web of needled fibers forming a velvet face layer and a sole. The fibers of the web include at least 50% by mass and preferentially at least 75% by mass of hollow fibers. The velvet density of the web is greater than or equal to 0.04 g/cm$^3$ and preferentially comprised between 0.04 g/cm$^3$ and 0.06 g/cm$^3$. This results in a velvet from which solid wastes are easily cleaned, while limiting the production costs.

13 Claims, 1 Drawing Sheet

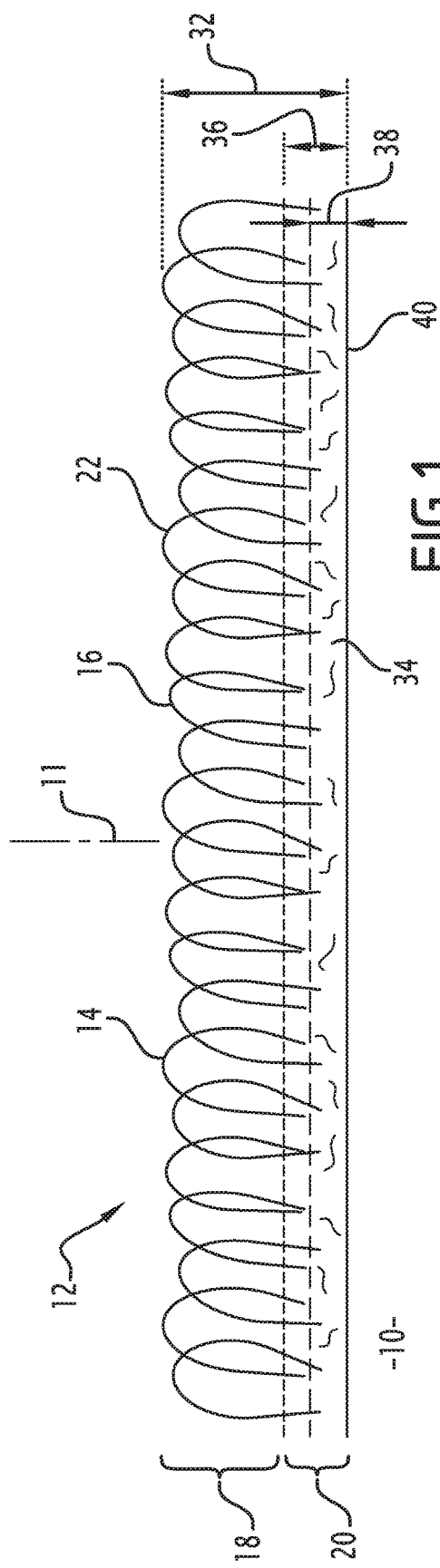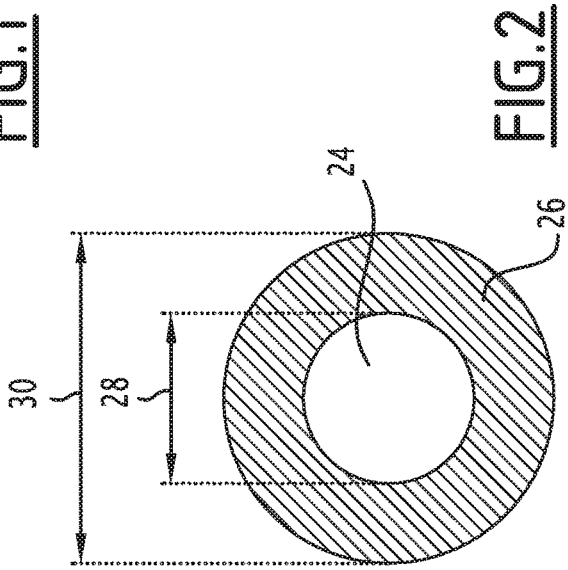

AUTOMOBILE CLEANABLE CARPET

TECHNICAL FIELD

The present invention relates to a piece of interior equipment of an automobile vehicle, of the type including a non-woven web of needled fibers forming a velvet face layer and a sole.

BACKGROUND

Carpets used in automobiles as a floor coating are essentially needled carpets of the "flat needled fabrics" or "Dilour™" needled carpets.

These carpets belong to the family of non-wovens. They are preferred to woven traditional coatings, since they are deformable and may fit the shapes of floorings of vehicles.

The "Dilour™" needled carpets are also called "velvet needled carpets" because of their surface aspect. This velvet consists of randomly distributed fibers. These fibers may be in the form of individual tufts or fibers.

These carpets are formed from a web of non-woven fibers, for example made by carding-lapping. The web undergoes a needling operation, or "dilourage", consisting of partly pulling fibers out of the web in order to form loops at the surface of said web.

The needling is for example carried out on a "Dilour™" machine consisting of a conveyor equipped with a set of brushes and a needling head equipped with needle boards. The needles carry away a portion of the fibers of the web as far as the interior of the brushes of the conveyor, over a depth which will correspond to the height of the velvet of the finished product.

Simultaneously with the making up of the velvet, the needling densifies the web by contributing to the entanglement of the fibers in the portion of the web called "sole", lying on the surface of the brushes. The thickness of the sole is gradually reduced as the fibers are entangled.

At the end of this needling operation, or dilourage, a tufted velvet is obtained. The latter may then undergo a shearing operation aiming at cutting the top of the loops in order to obtain a velvet consisting of individual fibers.

Such a sheared velvet, or shaved velvet, is always easier to clean than a tufted velvet. Indeed, the shape of the loops provides better adhesion to small size solid wastes, such as plants wastes or gravels.

However, the shearing operation has a non-negligible cost since it is technically difficult to put a clipper in line behind a "Dilour™" machine. Further, the shearing generates between 5% and 10% of loss of the engaged material.

SUMMARY

An object of the invention is to provide a velvet easy to clean from solid wastes, while limiting the production costs.

For this purpose, the invention relates to a piece of equipment of the aforementioned type, wherein the fibers of the web comprise at least 50% by mass and preferentially at least 75% by mass of hollow fibers; and the velvet density of the web is greater than or equal to 0.04 g/cm$^3$ and preferentially comprised between 0.04 g/cm$^3$ and 0.06 g/cm$^3$.

According to other advantageous aspects of the invention, the piece of equipment includes one or several of the following features, taken individually or according to all the possible technical combinations:

the hollow fibers are formed with thermoplastic material, preferentially polyethylene terephthalate (PET);

the linear density of the hollow fibers is greater than or equal to $10^{-4}$ g/m;

the part includes a connecting component impregnating a portion of a thickness of the sole;

the connecting component has a melting point below that of a material forming the hollow fibers.

The invention further relates to a method for manufacturing an interior piece of equipment of an automobile vehicle as described above, including the following steps: bringing a non-woven web of fibers onto a conveyor equipped with brushes, the web including hollow fibers; and needling of the web facing the brushes in order to form a sole in contact with the conveyor and a velvet face layer opposite the conveyor.

According to other advantageous aspects of the invention, the method includes one or several of the following features, taken individually or according to all the possible technical combinations:

the non-woven web further includes binding fibers which are at least partly meltable; and the method then includes a heat-binding step in which the binding fibers at least partly melt;

the binding fibers comprise a core and an outer sheath surrounding the core, said outer sheath has a melting temperature below a melting temperature of the core; and during the heat-binding step, the sheath at least partly melts, forming the connecting component impregnating a portion of the thickness of the sole;

the method then comprises the following steps: a connecting component is deposited on an external surface of the sole; and then the external surface is heated so as to allow melting or cross-linking and partial penetration of the connecting component into the sole;

the connecting component is deposited in a powdered form, or as a film, or as a non-woven, or in liquid form such as latices, plastisols or organosols.

BRIEF DESCRIPTION OF THE DRAWINGS

The invention will be better understood upon reading the description which follows, only given as a non-limiting example and made with reference to the drawings wherein:

FIG. 1 is a partial side, sectional view, of a piece of equipment according to an embodiment of the invention; and FIG. 2 is a partial cross-sectional view of the part of FIG. 1.

DETAILED DESCRIPTION

A piece 10 of interior equipment of an automobile vehicle according to an embodiment of the invention is illustrated by FIG. 1.

The part 10 is for example an interior equipment carpet of an automobile vehicle, intended to be laid on the floor or on a wall of the vehicle.

The part 10 extends substantially perpendicularly to a main direction 11. A total thickness of the part 10 according to 10 and 11 is for example comprised between 3 mm and 8 mm.

The part 10 includes a web 12 of needled fibers 14, 16, at least partly bound together, delimiting a velvet face layer 18 and a back layer forming a sole 20. The face layer 18 and the sole 20 are stacked along the direction 11.

Preferably, the web 12 has a surface mass greater than 300 g/m² and more preferentially comprised between 400 g/m² and 1,000 g/m².

The fibers 14, 16 are randomly distributed. On the velvet face layer 18, the fibers 14, 16 appear as loops 22.

The fibers 14, 16 of the web 12 comprise at least 50% by mass and preferentially at least 75% by mass, of hollow fibers 14. FIG. 2 illustrates a cross-sectional view of a hollow fiber 14.

The hollow fibers 14 include at least one internal empty space 24 extending axially along the fiber 14. In the example of FIG. 2, the fiber 14 has a tubular shape, a wall 26 of said fiber having a ring-shaped section. Preferably, the internal empty space 24 occupies between 15% and 35%, preferentially about 25%, of the section of the fiber 14. As an example, an internal diameter 28 and an external diameter 30 of the wall 26 are about 15 μm and about 40 μm respectively.

Preferably, like in the example of FIG. 2, the section of the hollow fiber 14 has a substantially circular or oval contour. Other shapes are also possible, notably an open shape where the internal empty space 24 communicates with the outside of the hollow fiber 14.

The wall 26 of the hollow fibers 14 is for example made on the basis of a thermoplastic polymer, such as polypropylene, polyethylene terephthalate, polyamide, polylactic acid, mixtures thereof or copolymers thereof. Preferably, the wall 26 of the hollow fibers 14 is in polyethylene terephthalate (PET).

According to an embodiment of the invention, the web 12 further comprises binding solid fibers 16. The binding fibers 16 are dispersed on the whole of the web 12 and are both present in the face layer 18 and in the sole 20, homogenously.

The binding fibers 16 are at least partly meltable. They for example include two-component fibers comprising a core and an outer sheath surrounding the core. The outer sheath has a melting temperature below the melting temperature of the core.

For example, the core is made in polyethylene terephthalate (PET) and the sheath in co-polyethylene terephthalate (Co-PET).

Alternatively, the binding fibers 16 are consists of a single polymer, having a melting point below the melting point of hollow fibers 14, advantageously lower by about 50° C. than the melting point of the hollow fibers 14.

In the case when the hollow fibers 14 are based on polyethylene terephthalate, the binding fibers 16 are for example formed on the basis of polypropylene, polyethylene or co-polyethylene terephthalate, mixtures thereof, or copolymers thereof.

Preferentially, a mass content of binding fibers 16, relatively to the total mass of the fibers 14, 16 of the web 12, is comprised between 1% and 15%, more preferentially between 6% and 12%.

In a second alternative, the web does not contain any binding fibers; the cohesion of the finished product will conventionally be ensured by a back coating of the sole, for example by means of an SBR (styrene butadiene rubber) latex.

A length of the fibers 14, 16 forming the web 12 is for example comprised between 40 mm and 100 mm. Preferably, the linear density of the hollow fibers 14 is greater than or equal to 10 dtex, i.e. $10^{-4}$ g/m. More preferentially, the linear density of the hollow fibers 14 is comprised between 6 dtex and 20 dtex.

The density of the velvet in the face layer 18 is greater than or equal to 0.04 g/cm³ and preferentially comprised between 0.04 g/cm³ and 0.06 g/cm³.

This velvet density is notably measured by determining the ratio between the weight of the material obtained by shearing the whole of the face layer 18 down to the sole 20, relatively to the initial volume of the shorn layer. Said initial volume corresponds to the shorn surface multiplied by an average height 32 of the face layer 18, along the direction 11.

The velvet yield, consisting of the ratio of the weight of the velvet after shearing relatively to the total weight of the part 10 before shearing is for example comprised between 15% and 40%.

The sole 20 is in the form of a flat needled fabric. Its thickness is advantageously less than that of the face layer 18.

The surface mass of the sole 20 is preferably greater than 200 g/m², and more preferentially comprised between 200 g/m² and 800 g/m².

According to an embodiment of the invention, the part 10 includes a connecting component 34 impregnating a portion of the thickness 36 of the sole 20.

The connecting component 34 is positioned in the sole 20 over a thickness 38 less than that 36 of the sole 20, taken from an outer surface 40 of the sole 20.

The connecting component 34 is preferentially a thermoplastic polymer or a copolymer of the same nature as the polymer making up the hollow fibers 14.

Preferentially, as described hereafter, the connecting component 34 is brought by the meltable sheath of two-component binding fibers 16 described above.

Preferably, the connecting component 34 has a melting point below that of the wall 26 of the hollow fibers 14. For example, if the hollow fibers 14 are in polyethylene terephthalate, the connecting component 34 is for example formed with a thermoplastic selected from among polypropylene, polyethylene, polylactic acid, polyamide, polyurethane, mixtures thereof or copolymers thereof.

According to an alternative embodiment, the connecting component 34 is a latex of the SBR type.

Preferably, a mass percentage of the connecting component 34, based on the total mass of the web 12, is less than 30% and is notably comprised between 10% and 20%.

A method for manufacturing a piece of equipment 10 as described above will now be described, from hollow fibers 14.

The hollow fibers 14 preferably undergo a first sizing step, i.e. deposition on the fibers of a protective coating. Optionally, the hollow fibers 14 are then mixed with solid fibers 16. According to an embodiment of the invention, as described earlier, at least one portion of the solid fibers 16 is formed with binding fibers.

The fibers 14, 16 are then subject to a carding/lapping step in order to form the web 12. Said web then optionally undergoes a step of pre-needling, intended to provide the web 12 with a maximum of planar cohesion, while allowing subsequent formation of velvet.

The method then includes a step for needling the web 12, notably on a "Dilour™" machine comprising a conveyor equipped with brushes. The velvet face layer 18 and the sole 20 are then obtained on either side of the web 12.

In the case when the web 12 includes binding fibers 16, the needled web 12 then undergoes a heat-binding step: the web 12 is heated up to a temperature above the melting temperature of the binding fibers 16, notably greater than 90° C., and preferentially comprised between 110° C. and 210° C. The binding fibers 16 at least partly melt and reinforce the sole 20. In the case of two-component binding fibers 16, the sheath of the binding fibers at least partly melts, forming the connecting component 34.

In the case when the web 12 is without any binding fibers, a connecting component 34 is deposited on the external surface 40 of the sole 20 subsequent to the needling step. In this step, the connecting component 34 is advantageously brought into a powdered form, as a film, as a non-woven, or in liquid form (Latex, plastisol or organosol). The external surface 40 is then heated so as to allow melting or cross-linking and partial penetration of the connecting component 34 in the sole 20.

The step for depositing, melting or cross-linking the connecting component 34 on the surface 40 may be additionally carried out on a web 12 containing binding fibers 16, subsequent to a heat-binding operation.

A method similar to the method described above is notably described in application FR 14 51788, not yet published.

A piece 10 of automotive equipment from the method described above is particularly easy for cleaning solid wastes of small size, such as plant wastes or gravel. The examples hereafter illustrate this aspect of the invention.

Example 1: Making a First Automobile Coating Part

A coating A is made according to the method described above for the part 10 of automotive equipment. The web 12 has a surface mass of 550 g/m² and consists of hollow fibers 14 in PET, with a linear density of 12 dtex. With reference to FIG. 2, an internal diameter 28 and an external diameter 30 of the fibers 14 are of 15 µm and of 40 µm, respectively.

The pre-needling density is from 40 to 120 counts/cm²; the needling or dilourage density is from 300 to 600 counts/cm². The needles of the needling machine are fork needles for example VG1000 (Groz Becker).

A coating A with tufted velvet is obtained. The velvet height 32 is of about 4 mm. The velvet density of the coating A is of 0.055 g/cm³.

Example 2: Making a Second Part of Automobile Coating

The coating A of example 1 is shorn so as to cut the top of the loops in order to form a shaved velvet. The velvet height of the obtained coating B is of about 3.5 mm.

Example 3: Making a Third Part of Automobile Coating

As a comparison, a coating C of automotive equipment is made according to the method of example 1, from a web having a surface mass of 550 g/m² and consisting of solid fibers in PET, with a linear density of 17 dtex. The velvet density of the coating C is 0.025.

For the needs of the test described in example 4, the coatings A, B and C are made from dark color fibers.

Example 4: Cleanability Test

The coatings A, B and C are subject to a cleanability test according to the RSA D47 3010 method: each tested coating is placed against the internal wall of a hollow drum BTW. 10 g of wood shavings, with a length comprised between 1.8 mm and 2.5 mm are placed in the drum, as well as a standardized tetrapod of 1 kg. The drum is driven into rotation for 1,000 revolutions.

The tested coating is then extracted from the drum and one half of the surface of said coating is subject to suction in two directions (negative pressure: 31 kPa; air: 40 dm³/s-nozzle: 8 cm²).

A mask comprising 6 circular holes with a diameter of 50 mm is placed on the sucked-up portion of the coating. A graphic analysis device evaluates the amount of shavings remaining attached onto the surface of the coating visible through each hole, on the basis of comparison between the pale color of the shavings and the dark color of the coatings. An average value is then calculated on the basis of the 6 obtained values.

A cleanability score, proportional to the surface percentage covered with shavings, is obtained. The lower the score, the more the coating is easily cleanable. The interval ranges from 0 to 25. The above coatings obtain the following scores from Table I:

TABLE I

|  | Coating | | |
| --- | --- | --- | --- |
|  | A | B | C |
| Cleanability score | 5 | 2 | 11 |

As a comparison, a shorn conventional "Dilour™" needled fabric obtains a cleanability score of 7.5, a non-shorn conventional "Dilour™" needled fabric obtains a cleanability score of 13.

The result obtained for coating A shows that the use of hollow fibers gives the possibility of improving the cleanability of non-shorn velvet as compared with the state of the art.

An assumption suggested for explaining this result is that, for a same linear density, the hollow fibers have greater stiffness than that of solid fibers. Indeed, the moment of inertia of the fibers considered as a cylinder (solid or hollow) is approximately proportional to the $4^{th}$ power of the outer diameter. The hollow fibers thus oppose more efficiently the penetration of the shavings into the velvet. During the carrying out of the test, the suction consequently would be made more effective.

Moreover, at an identical linear density, a hollow fiber has an outer diameter greater than that of a solid fiber. Thus, a hollow fiber of 12 dtex has an outer diameter of 42 µm comparatively with that of a solid fiber of 12 dtex which is 32 µm. Consequently, at equal velvet density, the average distance between two hollow fibers is less, this makes the penetration of the shavings further more difficult.

Finally, the applicant noticed that everything being moreover equal, the velvet density of a web consisting of hollow fibers is greater by about 40% to the density of a web consisting of solid fibers. This may be explained by the compressibility of hollow fibers which allows them to occupy less volume and therefore better fill the fork of the needles. This greater density further reduces the distance between hollow fibers in the velvet thus limiting penetration of the shavings.

Thus, it is seen that all these factors, velvet density, outer diameter reducing the inter-fiber distance and improved stiffness of the fiber, contribute to making penetration of the dirt much more difficult which mechanically leads to a clearly improved cleanability.

However, the coating C is formed with solid fibers with an outer diameter identical with that of the coating A, therefore of similar stiffness. This coating C however has less cleanability as compared with the other tested coatings. The effect associated with the hollow fibers is therefore surprising.

Moreover, the coatings A and B give good results in the other tests usually practiced for this type of coatings, such as abrasion resistance and detachment resistance tests.

The invention claimed is:

1. A part of interior equipment of an automobile vehicle, comprising a non-woven web of needled fibers forming a velvet face layer and a sole, said velvet face layer comprising loops formed by said needled fibers at a surface of said non-woven web, wherein:
   the fibers of the web comprise at least 50% by mass of hollow fibers; and
   velvet density of the web is greater than or equal to 0.04 g/cm$^3$.

2. The part according to claim 1, wherein the fibers of the web comprise at least 75% by mass of hollow fibers.

3. The part according to claim 1, wherein the velvet density of the web is between 0.04 g/cm$^3$ and 0.06 g/cm$^3$.

4. The part according to claim 1, wherein the hollow fibers are formed with a thermoplastic material.

5. The part according to claim 4, wherein the thermoplastic material comprises polyethylene terephthalate (PET).

6. The part according to claim 1, wherein the linear density of the hollow fibers is greater than or equal to $10^{-4}$ g/m.

7. The part according to claim 1, further comprising a binding component impregnating a portion of a thickness of the sole.

8. The part according to claim 7, wherein the binding component has a melting point below that of a material forming the hollow fibers.

9. A method for manufacturing the part of claim 1, comprising the following steps:
   bringing a non-woven web of fibers on a conveyor equipped with brushes, the web including hollow fibers;
   needling the web facing the brushes in order to form a sole in contact with the conveyor and a velvet face layer opposite to the conveyor, said needling step comprising partly pulling fibers out of the web in order to form loops at a surface of said web.

10. The method according to claim 9, wherein:
    the non-woven web further includes at least partly meltable binding fibers;
    the method then includes a heat-binding step in which the binding fibers at least partly melt.

11. The method according to claim 10, wherein:
    the binding fibers comprise a core and an outer sheath surrounding the core, said outer sheath having a melting temperature below a melting temperature of the core; and
    during the heat-binding step, the sheath at least partly melts, forming a binding component impregnating a portion of the thickness of the sole.

12. The method according to claim 9, further comprising the steps of:
    depositing a binding component on an external surface of the sole; and then
    heating the external surface so as to cause melting or cross-linking or partial penetration of the binding component into the sole.

13. The method according to claim 12, wherein the binding component is deposited in a powdery form, or as a film, or in the form of a non-woven, or in liquid form such as latices, plastisols or organosols.

* * * * *